(12) United States Patent
Nanba et al.

(10) Patent No.: US 6,837,803 B2
(45) Date of Patent: Jan. 4, 2005

(54) GOLF BALL

(75) Inventors: Atsushi Nanba, Chichibu (JP);
Nobuyuki Kataoka, Chichibu (JP);
Hiroshi Higuchi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/422,936

(22) Filed: Apr. 25, 2003

(65) Prior Publication Data

US 2004/0018892 A1 Jan. 29, 2004

(30) Foreign Application Priority Data

Jul. 29, 2002 (JP) .................................. 2002-219180

(51) Int. Cl.$^7$ ............................................. A63B 37/00
(52) U.S. Cl. .................................................. 473/351
(58) Field of Search ................................. 473/351, 376

(56) References Cited

U.S. PATENT DOCUMENTS

| | | | |
|---|---|---|---|
| 4,683,257 A | | 7/1987 | Kakiuchi et al. |
| 4,929,678 A | | 5/1990 | Hamada et al. |
| 4,955,613 A | * | 9/1990 | Gendreau et al. ........... 473/372 |
| 4,990,570 A | * | 2/1991 | Saito et al. .................. 525/254 |
| 5,082,285 A | | 1/1992 | Hamada et al. |
| 5,585,440 A | * | 12/1996 | Yamada et al. ............. 525/193 |
| 6,194,505 B1 | * | 2/2001 | Sone et al. .................. 524/432 |
| 6,277,924 B1 | | 8/2001 | Hamada et al. |
| 6,312,346 B1 | | 11/2001 | Sugimoto |
| 6,315,679 B1 | | 11/2001 | Sano |

2002/0137848 A1  9/2002  Sone et al.

FOREIGN PATENT DOCUMENTS

| | | |
|---|---|---|
| JP | 11-035633 A | 2/1999 |
| JP | 11-319148 A | 11/1999 |

OTHER PUBLICATIONS

Antioxidant Sheet.*
Mark R. Mason et al.; "Hydrolysis of Tri–tert–butylaluminum: The First Structural Characterization of Alkylalunoxanes [$(R_2Al)_2O]_n$ and $(RA10)_n$ "; J. Am. Chem. Soc. 1993, 115; pp. 4971–4984.
C. Jeff Harlan; "Three–Coordinate Aluminum Is Not a Prerequisite for Catalytic Activity in the Zirconocene—Alumoxane Polymerization of Ethylene"; J. Am. Chem. Soc. 1995, E. 117: pp. 6465–6474.
"Reaction Mechanisms in Metallocene Catalyzed Olefin Polymerization"; Report of Research & Development, vol. 23, No. 9; 1994; pp. 5–15.

* cited by examiner

*Primary Examiner*—Raeann Gorden
(74) *Attorney, Agent, or Firm*—Sughrue Mion, PLLC

(57) ABSTRACT

A golf ball includes, as a composing element, a hot-molded product of a rubber composition. The rubber composition contains a polybutadiene having 60 wt % or more of cis-1,4-bonds and 40 or more of a Mooney viscosity ($ML_{1+4}(100°$ C.)), unsaturated carboxylic acid and/or a metal salt thereof, an organic peroxide, and a monophenol based antioxidant. The golf ball can be produced with good workability because of no burn at the time of kneading the rubber composition, while preventing a reduction in rebound characteristic.

6 Claims, No Drawings

GOLF BALL

BACKGROUND OF THE INVENTION

The present invention relates to a golf ball excellent in rebound characteristic.

Rubber compositions of a type containing a polybutadiene having 80 wt % or more of cis-1,4-bonds obtained by synthesis using a nickel or cobalt based catalyst have been desirably used as cores for two-piece golf balls or multi-piece golf balls or solid centers of thread-wound golf balls because of their high rebound characteristic and durability. It has been known that a polybutadiene obtained by synthesis using a lanthanoide based catalyst can be also used for the same applications as those described above. Further, it has been disclosed, for example, in Japanese Patent Publication No. Hei 6-80123, that a rubber composition containing two kinds of polybutadienes, obtained by synthesis using these catalysts (nickel or cobalt based catalyst and lanthanoide based catalyst), at a specific ratio can be desirably used for golf balls.

On the other hand, suitable amounts of a co-crosslinking agent, an organic peroxide, an inorganic filler, an antioxidant, and the like are blended in the above-described rubber composition for a golf ball.

Here, with respect to the antioxidant, from the viewpoint of preventing burn at the time of kneading a rubber composition, there has been used a bisphenol based antioxidant. For example, golf balls of a type using, as a core, a rubber composition containing a bisphenol based antioxidant have been disclosed in Japanese Patent No. 2644226, Japanese Patent Laid-open Nos. Hei 3-151985, Hei 11-70187, Hei 11-164912, Hei 11-319148, and 2000-42141, and the like.

The use of such a rubber composition containing a bisphenol based antioxidant, however, has a disadvantage in reducing the rebound characteristic of a golf ball produced by using the rubber composition.

SUMMARY OF THE INVENTION

An object of the present invention is to provide a golf ball including, as a composing element, a vulcanization-molded product of a rubber composition excellent in preventing burn at the time of kneading the rubber composition while preventing a reduction in rebound characteristic.

The present inventor has examined to achieve the above object, and found that a rubber composition excellent in preventing burn at the time of kneading the rubber composition while preventing a reduction in rebound characteristic can be obtained by blending a monophenol based antioxidant in the rubber composition, and the present inventor has thus accomplished the present invention on the basis of such knowledge.

To achieve the above object, according to an aspect of the present invention, there is provided a golf ball including, as a composing element, a hot-molded product of a rubber composition, wherein the rubber composition contains a polybutadiene having 60 wt % or more of cis-1,4-bonds and 40 or more of a Mooney viscosity ($ML_{1+4}$(100° C.)), unsaturated carboxylic acid and/or a metal salt thereof, an organic peroxide, and a monophenol based antioxidant.

The polybutadiene is preferably obtained by synthesis using a rare earth element based catalyst.

The blended amount of said organic peroxide is preferably in a range of 0.1 to 0.9 part by weight on the basis of 100 parts by weight of said polybutadiene.

The blended amount of said monophenol based antioxidant is preferably in a range of 0.05 to 3 parts by weight on the basis of 100 parts by weight of said polybutadiene.

The organic peroxide is preferably composed of two or more kinds of organic peroxides. In this case, letting the organic oxide shortest in half-life period at 155° C. be (a), the organic oxide longest in half-life period at 155° C. be (b), the half-life period of said organic peroxide (a) be ($a_1$), and the half-life period of said organic peroxide (b) be ($b_1$), the ratio $b_1/a_1$ is preferably in a range of 7 or more.

The hot-molded product is preferably used as a core of a solid golf ball.

DETAILED DESCRIPTION OF THE PREFERRED EMBODIMENTS

The present invention will now be described in detail.

A rubber composition used for a golf ball of the present invention contains a polybutadiene (A), unsaturated carboxylic acid and/or a metal salt thereof (B), an organic oxide (C), an organic sulfur compound (D) and an inorganic filler (E), (D) and (E) as optional components, and a monophenol based antioxidant (F).

The polybutadiene (A) is required to have cis-1,4-bonds in an amount of 60% (percentage by weight, the same applying in the following) or more, preferably, 80% or more, more preferably, 90% or more, most preferably, 95% or more. If the amount of the cis-1,4-bonds is too small, the rebound characteristic is reduced.

From the viewpoint of rebound characteristic, the Mooney viscosity [$ML_{1+4}$(100° C.)] of the polybutadiene (A) is required to be in a range of 40 or more, preferably, 50 or more, more preferably, 52 or more, most preferably, 54 or more, with the upper limit thereof being in a range of 140 or less, preferably, 120 or less, more preferably, 100 or less, most preferably, 80 or less.

The Mooney viscosity used herein is an industrial index of viscosity measured by a Mooney viscometer (one kind of rotary plastimeter) under JIS-K6300. The Mooney viscosity is expressed in $ML_{1+4}$ (100° C.), where M indicates the Mooney viscosity, L is a large rotor (L-type) of the plastimeter, "(1+4)" is a pre-heating time (1 min) and a rotational time of the rotor (4 min), and "100° C." is a measurement temperature.

The polybutadiene (A) is preferably obtained by synthesis using a rare earth element based catalyst selected from those known in the art.

For example, a lantern series rare earth element compound, an organic aluminum compound, alumoxane, or a halogen containing compound may be used as the rare earth element based catalyst. If needed, such a compound may be combined with a Lewis base.

Examples of the lantern series rare earth element compounds include a halide, a carboxylate, an alcoholate, a thioalcoholate, and an amide of a metal having the atomic number of 57 to 71.

Examples of the organic aluminum compounds include compounds expressed, for example, by $AlR^1R^2R^3$ (wherein $R^1$, $R^2$, and $R^3$ may be identical to each other or different from each other, and each of $R^1$, $R^2$, and $R^3$ is a residual hydrocarbon group having the hydrogen or carbon number of 1 to 8).

Preferred examples of the alumoxanes include compounds having structures shown in formulas (I) and (II). Aggregates of alumoxane described in Fine Chemical 23, (9), 5 (1994), J. Am. Chem. Soc., 115, 4971 (1993), or J. Am. Chem. Soc., 117, 6465 (1995) are also acceptable.

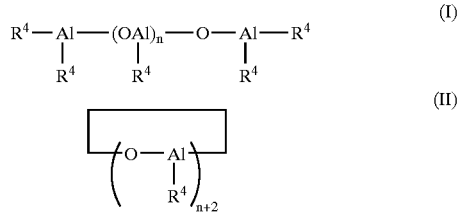

(wherein, $R^4$ is a hydrocarbon group having carbon atoms of the carbon number of 1 to 20, and n is an integer of 2 or more).

Examples of the halogen containing compounds include an aluminum halide shown by $AlX_nR_{3-n}$ (wherein X is a halogen, R is a residual hydrocarbon group having the carbon number of 1 to 20, for example, an alkyl group, aryl base, or aralkyl base, and n is 1, 1.5, 2 or 3), a strontium halide such as $Me_3SrCl$, $Me_2SrCl_2$, $MeSrHCl_2$, or $MeSrCl_3$ (wherein Me is methyl), and other metal halides such as silicon tetrachloride, tin tetrachloride, and titanium tetrachloride.

The Lewis base can be used to form a complex with the lantern series rare earth element compound. Examples of the Lewis bases include acethyl acetone and ketone alcohol.

According to the present invention, especially, the use of a neodymium based catalyst using a neodymium compound as the lantern series rare earth element compound is preferred because it allows a polybutadiene rubber containing a large amount of cis-1,4-bonds and a small amount of 1,2-vinyl bonds to be obtained with an excellent polymerization activity. A preferred example of the rare earth element based catalyst has been described in Japanese Patent Laid-open No. Hei 11-35633.

To specify the content of the cis-1,4-bonds and the Mw/Mn ratio of the polybutadiene polymerized from butadiene monomers in the presence of the rare earth element based catalyst using a lanthanum series rare earth element compound in the above-described ranges, the molar ratio of butadiene/lanthanum series rare earth element compound may be in a range of 1,000 to 2,000,000, especially, 5,000 to 1,000,000, and the molar ratio of $AlR^1R^2R^3$/lanthanum series rare earth element compound may be in a range of 1 to 1,000, especially, 3 to 500. Also, the molar ratio of halide/lanthanum series rare earth element compound may be in a range of 0.1 to 30, especially, 0.2 to 15, and the molar ratio of Lewis base/lanthanum series rare earth element compound may be in a range of 0 to 30, especially, 1 to 10.

The polymerization of butadiene monomers in the presence of a rare earth element based catalyst may be performed by a bulk polymerization or vapor-phase polymerization process, either with or without the use of a solvent. The polymerization temperature is generally in a range of −30 to 150° C., preferably, 10 to 100° C.

The polybutadiene (A) may be obtained by polymerizing butadiene monomers with the above-described rare earth based catalyst, followed by reaction of active terminals of the resultant polymer with a terminal modifier.

A modified polybutadiene rubber can be obtained by modifying the polybutadiene, which has been obtained by the above-described polymerization, by using each of the following terminal modifiers (1) to (7):

(1) The first terminal modifier is an alkoxy silyl group-containing compound. A modified polybutadiene rubber can be obtained by making an alkoxy silyl group-containing compound react with an active terminal of the polymer. An alkoxy silane compound having at least one epoxy group or isocyanate group in a molecule is preferably used as the alkoxy silyl group-containing compound. Examples of the alkoxy silane compounds include epoxy group-containing alkoxy silane compounds and icocyanate group-containing alkoxy silane compounds.

Specific examples of the epoxy group-containing alkoxy silane compounds include 3-glycidyloxypropyl trimethoxy silane, 3-glycidyloxypropyl triethoxy silane, (3-glycidyloxypropyl)methyldimethoxy silane, (3-glycidyloxypropyl)methyldiethoxy silane, β-(3,4-epoxy cyclohexyl)trimethoxy silane, β-(3,4-epoxy cyclohexyl) triethoxy silane, β-(3,4-epoxy cyclohexyl)methyldimethoxy silane, β-(3,4-epoxy cyclohexyl)ethyldimethoxy silane, a condensate of 3-glycidyloxypropyl trimethoxy silane, and a condensate of (3-glycidyloxypropyl)methyldimethoxy silane.

Specific examples of the isocyanate group-containing alkoxy silane compounds include 3-isocyanate propyl trimethoxy silane, 3-isocyanate propyl triethoxy silane, (3-isocyanate propyl)methyldimethoxy silane, (3-isocyanate propyl)methyldiethoxy silane, a condensate of 3-isocyanate propyl trimethoxy silane, and a condensate of (3-isocyanate propyl)methyldimethoxy silane.

In reaction of the above-described alkoxy silyl group-containing compound with an active terminal, the Lewis base can be added in order to facilitate the reaction. The Lewis base acts as a catalyst for facilitating the coupling reaction, to improve the cold flow of the modified polymer, thereby enhancing the storage stability. Examples of the Lewis bases include dialkyltin dialkyl maleate, dialkyltin dicarboxylate, and aluminum trialkoxide.

(2) The second terminal modifier is a halogenated organic metal compound, a halogenated metal compound, or an organic metal compound shown by $R^5{}_nM'X_{4-n}$, $M'X_4$, $M'X_3$, $R^5{}_nM'(-R^6-COOR^7)_{4-n}$, or $R^5{}_nM'(-R^6-COR^7)_{4-n}$, (wherein $R^5$ and $R^6$, each of which is a hydrocarbon group having carbon atoms of the carbon number of 1 to 20, may be identical to each other or different from each other; $R^7$ is a hydrocarbon group having carbon atoms of the carbon number of 1 to 20, which may contain a carbonyl group or ester group at a side chain; M' is a tin atom, silicon atom, germanium atom, or phosphorus atom; X is a halogen atom; and n is 0 or an integer selected from 1 to 3).

(3) The third terminal modifier is a heterocumulene compound containing, in molecules, Y=C=Z bonds (wherein Y is a carbon atom, oxygen atom, nitrogen atom, or sulfur atom; and Z is an oxygen atom, nitrogen atom, or sulfur atom).

(4) The fourth terminal modifier is a three-membered heterocyclic compound containing, in molecules, the following bonds:

(wherein Y is an oxygen atom, nitrogen atom, or sulfur atom).

(5) The fifth terminal modifier is a halogenated isocyano compound.

(6) The sixth terminal modifier is a carboxylic acid, an acid halide, an ester compound, a carbonic ester compound, or an acid anhydride shown by a formula of $R^8-(COOH)_m$, $R^9(COX)_m$, $R^{10}-(COO-R^{11})_m$, $R^{12}-OCOO-R^{13}$, or $R^{14}-(COOCO-R^{15})_m$, or the following formula:

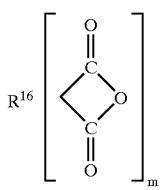

(wherein $R^8$ to $R^{16}$, each of which is a hydrocarbon group having carbon atoms of the carbon number of 1 to 50, may be identical to each other or different from each other; X is a halogen atom; and m is an integer selected from 1 to 5).

(7) The seventh terminal modifier is a metal salt of a carboxylic acid shown by a formula of $R^{17}{}_1M"$ $(OCOR^{18})_{4-l}$, $R^{19}{}_1M"$ $(OCO—R^{20}—COOR^{21})_{4-l}$, or the following formula:

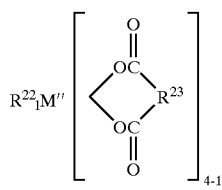

(wherein $R^{17}$ to $R^{23}$, each of which a hydrocarbon group containing carbon atoms of the carbon number of 1 to 20, may be identical to each other or different from each other; M" is a tin atom, silicon atom, or germanium atom; 1 is 0 or an integer selected from 1 to 3).

Illustrative examples of the terminal modifiers of the types (1) to (6) and methods for reaction of the terminal modifiers have been disclosed, for example, in Japanese Patent Laid-open Nos. Hei 11-35633, Hei 7-268132, and 2002-293996.

A molecular weight distribution Mw/Mn (Mw: weight-average molecular weight, Mn: number-average molecular weight) of the polybutadiene (A) may be in a range of 2.0 or more, preferably, 2.2 or more, more preferably, 2.4 or more, most preferably, 2.6 or more, with the upper limit thereof being in a range of 8.0 or less, preferably, 7.5 or less, more preferably, 4.0 or less, most preferably, 3.4 or less. If the value Mw/Mn is too small, the workability may be degraded, whereas if the value Mw/Mn is too large, the rebound characteristic may be reduced.

According to the present invention, if needed, the polybutadiene (A) may be blended with any other diene based rubber, for example, styrene-butadiene rubber, natural rubber, isoprene rubber, or ethylene-propylene-diene rubber without departing from the scope of the present invention.

Examples of the unsaturated carboxylic acids of the component (B) include acrylic acid, methacrylic acid, maleic acid, and fumaric acid, among which acrylic acid and methacrylic acid are preferred. Examples of the metal salts of unsaturated carboxylic acids of the component (B) include zinc salts and magnesium salts of the above unsaturated aliphatic acids, among which zinc acrylate is preferred.

The blended amount of the unsaturated carboxylic acid and/or the metal salt thereof of the component (B) may be, on the basis of 100 parts (which means parts by weight, the same applying in the following) of the component (A), in a range of 10 parts or more, preferably, 15 parts or more, more preferably, 20 parts or more, with the upper limit thereof being in a range of 60 parts or less, preferably, 50 parts or less, more preferably, 45 parts or less, most preferably, 40 parts or less.

Examples of the organic peroxides (C) include dicumyl peroxide, and 1,1-bis(t-butyl peroxy)3,3,5-trimethylcyclohexane. These organic peroxides may be commercial products, examples of which include "Percumyl D" (available from NOF Corporation), "Perhexa 3M" (available from by NOF Corporation), and "Luperco 231XL" (available from Atochem Co.). If needed, two or more kinds of these organic peroxides may be used in combination.

The blended amount of the organic peroxide (C) may be, on the basis of 100 parts of the component (A), in a range of 0.1 part or more, preferably, 0.2 part or more, more preferably, 0.3 part or more, most preferably, 0.4 part or more, with the upper limit thereof being in a range of 0.9 part or less, preferably, 0.8 part or less, more preferably, 0.7 part or less, yet more preferably, 0.6 part or less, most preferably, 0.5 part or less.

The organic peroxide (C) may be composed of one kind of organic peroxide or a combination of two kinds or more of organic peroxides. In order to improve the rebound characteristic, however, the organic peroxide is preferably composed of a combination of two kinds or more of the compounds. In this case, letting an organic peroxide shortest in half-life period at 155° C. be (a), an organic peroxide longest in half-life period at 155° C. be (b), the half-life period of the organic peroxide (a) be ($a_1$), and the half-life period of the organic peroxide (b) be ($b_1$), the ratio $b_1/a_1$ is generally in a range of 7 or more, preferably, 8 or more, more preferably, 9 or more, most preferably, 10 or more, with the upper limit thereof being generally in a range of 20 or less, preferably, 18 or less, more preferably, 16 or less, most preferably, 14 or less. Even when the organic peroxide (C) is composed of two kinds or more of organic peroxides, if the ratio b1/a1 is out of the above range, the rebound, compression, and durability characteristics may be degraded.

The half-life period $a_1$ at 155° C. of the organic peroxide (a) may be in a range of 5 sec or more, preferably, 10 sec or more, more preferably, 15 sec or more, with the upper limit thereof being in a range of 120 sec or less, preferably, 90 sec or less, more preferably, 60 sec or less. The half-life period $b_1$ at 155° C. of the organic peroxide (b) may be in a range of 300 sec or more, preferably, 360 sec or more, more preferably, 420 or more, with the upper limit thereof being in a range of 800 sec or less, preferably, 700 sec or less, more preferably, 600 sec or less.

The total blended amount of the organic peroxide (C) containing the organic peroxides (a) and (b) may be, on the basis of 100 parts of the component (A), in a range of 0.1 part or more, preferably, 0.2 part or more, more preferably, 0.3 part or more, most preferably, 0.4 part or more, with the upper limit thereof being in a range of 0.9 part or less, preferably, 0.8 or less, more preferably, 0.7 part or less, most preferably, 0.6 part or less. If the blended amount is too small, the time required for crosslinking becomes longer, to reduce the productivity and significantly lower the compression characteristic, whereas if the blended amount is too large, the rebound characteristic and durability are reduced.

The added amount of the organic peroxide (a) may be, on the basis of 100 parts of the component (A), in a range of 0.05 part or more, preferably, 0.08 part or more, more preferably, 0.1 part or more, with the upper limit thereof being in a range of 0.5 part or less, preferably, 0.4 part or less, more preferably, 0.3 part or less. The added amount of the organic peroxide (b) may be, on the basis of 100 parts of the component (A), in a range of 0.05 part or more, preferably, 0.15 part or more, more preferably, 0.2 part or more, with the upper limit thereof being in a range of 0.7 part or less, preferably, 0.6 part or less, more preferably, 0.5 part or less.

Examples of the organic peroxides used for the organic peroxides (a) and (b) include dicumyl peroxide, 1,1-bis(t-butyl peroxy)3,3,5-trimethylcyclohexane, and α,α'-bis(t-butyl peroxy)diisopropylbenzene. These organic peroxides may be commercial products, examples of which include "Percumyl D" (available from NOF Corporation), "Perhexa 3M" (available from by NOF Corporation), and "Luperco 231XL" (available from Atochem Co.). To be more specific, a preferred example of the organic peroxide (a) is 1,1-bis(t-butyl peroxy)3,3,5-trimethylcyclohexane, and a preferred example of the organic peroxide (b) is dicumyl peroxide.

The organic sulfur compound (D) is directly added to a rubber compound. General examples of the organic sulfur compounds used for the organic sulfur compound (D) include thiophenol, thionaphthol, halogenated thiophenol, or metal salts thereof. Specific examples include pentachlorothiophenol, pentafluorothiophenol, pentabromothiophenol, parachlorothiophenol, and zinc salts thereof; and sulfur compounds each having the sulfur number of 2 to 4 such as diphenyl polysulfide, dibenzil polysulfide, dibenzoil polysulfide, dibenzothiazoil polysulfide, dithiobenzoil polysulfide, and alkylphenyl disulfide, sulfur compounds each having a furan ring, and sulfur compounds each having a thiophene ring, among which diphenyl disulfide and the zinc salt of pentachlorothiophenol are preferred. The blended amount of the organic sulfur compound may be, on the basis of 100 parts of the main rubber component, in a range of 0.1 part or more, preferably, 0.2 part or more, more preferably, 0.4 part or more, most preferably, 0.7 part or more, with the upper limit thereof being in a range of 5 parts or less, preferably, 4 parts or less, more preferably, 3 parts or less, yet more preferably, 2 parts or less, most preferably, 1.5 parts or less.

The rubber composition of the present invention preferably contains the inorganic filler (E). Examples of the inorganic fillers (E) include zinc oxide, barium sulfate, and calcium carbonate. The blended amount of the inorganic filler (E) may be, on the basis of 100 parts of the component (A), in a range of 5 parts or more, more preferably, 7 parts or more, more preferably, 10 parts or more, most preferably, 13 parts or more, with the upper limit thereof being in a range of 80 parts or less, preferably, 65 parts or less, more preferably, 50 parts or less, most preferably, 40 parts or less.

The rubber composition of the present invention is blended with the monophenol based antioxidant (F).

Examples of the monophenol based antioxidants (F) include 2,6-di-t-butyl-4-methylphenol, 2,6-di-t-butyl-4-ethylphenol, mono-(α-methylbenzyl)phenol, di-(α-methylbenzyl)phenol, tri-(α-methylbenzyl)phenol, 2-t-butyl-4-methoxyphenol, 3-t-butyl-4-methoxyphenol, and stearyl-β-(3,5-di-t-butyl-4-hydroxyphenyl)propionate, among which 2,6-di-t-butyl-4-methylphenol is preferred. These antioxidants may be used singly or in combination of two kinds or more.

The blended amount of the monophenol based antioxidant (F) may be, on the basis of 100 parts of the component A, generally in a range of 0.05 part or more, preferably, 0.2 part or more, more preferably, 0.5 part or more, with the upper limit thereof being generally in a range of 3 parts or less, preferably, 2 parts or less, more preferably, 1 part or less. If the blended amount is too large or small, it may fail to obtain the desirable rebound characteristic.

The vulcanization-molded product of the present invention can be obtained by vulcanizing and curing the above-described rubber composition by a method similar to that used for vulcanizing and curing a known rubber composition for a golf ball. For example, a vulcanizing temperature may be in a range of 100 to 200° C., and a vulcanizing time be in a range of 10 to 40 min.

According to the present invention, the hardness of the vulcanization-molded product can be suitably adjusted in accordance with the usage form of various types of golf balls to be described later, and is not particularly limited. For example, the cross-sectional hardness of the vulcanization-molded product may be uniform from the center to the surface of the molded-product, or a difference in cross-sectional hardness may be present between the center and the surface of the molded-product.

The type of the golf ball of the present invention may be any one of various types described later. In this case, if the golf ball of the present invention is of either a one-piece golf ball type or a golf ball type having a solid core or a solid center, it is recommended that a deflection amount, measured under an applied load of 980 N (100 kg), of the one piece solid golf ball, the solid core, or the solid center be generally in a range of 2.0 mm or more, preferably, 2.5 mm or more, more preferably, 2.8 mm or more, most preferably, 3.2 mm or more, with the upper limit thereof being in a range of 6.0 mm or less, preferably, 5.5 mm or less, more preferably, 5.0 mm or less, most preferably, 4.5 mm or less. If the deflection amount is too small, the hitting feel is degraded, and in particular, at the time of long-shot with a driver in which the ball is largely deformed, the spin date becomes too large, to shorten the flight distance, whereas if the deflection amount is too large, the hitting feel becomes dull, the flight distance is shortened because of insufficient rebound, and the durability against cracking due to repeated hitting may be degraded.

The golf ball of the present invention is characterized by including the above-described vulcanization-molded product as a composing element, but is not particularly limited in its structure type. To be more specific, the golf ball of the present invention may be any of a one-piece golf ball in which the vulcanization-molded product is directly applied to the golf ball, a two-piece solid golf ball in which the vulcanization-molded product is used as a solid core on the surface of which a cover is formed, a multi-piece solid golf ball having three-pieces or more in which the vulcanization-molded product is used as a solid core on the surface of which two or more cover layers are formed, and a thread-wound type golf ball in which the vulcanization-molded product is used as a center core. In particular, from the viewpoint of improving the extrusion characteristic of the rubber composition and imparting excellent rebound to the ball product by making effective use of the vulcanization-molded product, it is recommended to use the vulcanization-molded product of the present invention as a solid core of a two-piece solid golf ball or a multi-piece solid golf ball.

In the case of using the vulcanization-molded product of the present invention as the above-described solid core, it is recommended that the diameter of the solid core be in a range of 30.0 mm or more, preferably, 32.0 mm or more, more preferably, 35.0 mm or more, most preferably, 37.0 mm or more, with the upper limit thereof being in a range of 41.0 mm or less, preferably, 40.5 mm or less, more preferably, 40.0 mm or less, most preferably, 39.5 mm or less. In particular, it is recommended that the diameter of the solid core used for a two-piece solid golf ball be in a range of 37.0 mm or more, preferably, 37.5 mm or more, more preferably, 38.0 mm or more, most preferably, 38.5 mm or more, with the upper limit thereof being in a range of 41.0 mm or less, preferably, 40.5 mm or less, more preferably, 40.0 mm or less, and that the diameter of the solid core used for a three-piece solid golf ball be in a range of 30.0 mm or more, preferably, 32.0 mm or more, more preferably, 34.0 mm or more, most preferably, 35.0 mm or more, with the upper limit thereof being in a range of 40.0 mm or less, preferably, 39.5 mm or less, more preferably, 39.0 mm or less.

It is recommended that the specific gravity of the solid core be generally in a range of 0.9 or more, preferably, 1.0 or more, more preferably, 1.1 or more, with the upper limit thereof being in a range of 1.4 or less, preferably, 1.3 or less, more preferably, 1.2 or less.

In the case where the golf ball of the present invention is applied to a two-piece solid golf ball or a multi-piece solid golf ball, the golf ball can be produced by preparing a solid core formed of the vulcanization-molded product, and injecting-molding or press-molding a known intermediate layer material and a known cover material on the solid core.

Examples of materials used for the main component of each of the intermediate layer material and the cover material include a thermoplastic or thermosetting polyurethane based elastomer, a polyester based elastomer, an ionomer resin, a polyolefine based elastomer, and mixtures thereof. These materials may be used singly or in combination of two kinds or more. In particular, the thermoplastic polyurethane based elastomer or ionomer resin is preferred.

The thermoplastic polyurethane based elastomer may be a commercial product such as an elastomer containing aliphatic or aromatic diisocyanate, for example, "Pandex T7298, T7295, T7890, TR3080, T8295" (available from DIC-Bayer Polymer Co., Ltd.). The ionomer resin may be a commercial product such as "Surlyn 6320, or 8120" (available from E.I. du Pont de Nemours & Co., Ltd.), or "Himilan 1706, 1605, 1855, 1601, or 1557" (available from DuPont-Mitsui Polychemicals Co., Ltd.).

The main component of each of the intermediate layer material and the cover material may be blended with another polymer such as a thermoplastic elastomer other than that described above. Examples of such optional polymers may include a polyamide based elastomer, a styrene based block elastomer, a hydrogenated polybutadiene, and an ethylene-vinyl acetate (EVA) copolymer.

In the case of applying the golf ball of the present invention to a multi-piece solid golf ball including a solid core and two or more cover layers, the ball characteristics may be specified in the following manners (i) and (ii).

(i) A deflection amount, measured under an applied load of 100 kg, of the solid core formed from the rubber composition of the present invention may be in a range of 2.5 mm or more, especially, 3.0 mm or more, with the upper limit thereof being in a range of 6.0 mm or less, especially, 5.5 mm or less; and a Shore D hardness of the innermost cover layer may be in a range of 50 or more, especially, 55 or more, with the upper limit thereof being in a range of 70 or less, especially, 65 or less and a Shore D hardness of the outermost cover layer may be in a range of 40 or more, especially, 43 or more, with the upper limit thereof being in a range of 55 or less, especially, 50 or less, whereby the innermost cover layer is harder than the outermost cover layer. With this configuration, it is possible to obtain a multi-piece solid golf ball excellent in rebound and ball controllability.

In this case, the diameter of the core may be in a range of 30 mm or more, especially, 34 mm or more, with the upper limit thereof being in a range of 40 mm or less, especially, 39 mm or less; the thickness of the innermost cover layer may be in a range of 0.5 mm or more, especially, 1.0 mm or more, with the upper limit thereof being in a range of 3.0 mm or less, especially, 2.0 mm or less; the thickness of the outermost cover layer may be in a range of 0.5 mm or more, especially, 1.0 mm or more, with the upper limit thereof being in a range of 2.5 mm or less, especially, 2.0 mm or less; and the total thickness of the cover may be in a range of 1.0 mm or more, especially, 1.5 mm or more, with the upper limit thereof being in a range of 5.5 mm or less, especially, 4.5 mm or less.

(ii) A deflection amount, measured under an applied load of 100 kg, of the solid core formed from the rubber composition of the present invention may be in a range of 3.0 mm or more, especially, 3.5 mm or more, with the upper limit thereof being in a range of 6.0 mm or less, especially, 5.5 mm or less; and a Shore D hardness of the innermost cover layer may be in a range of 8 or more, especially, 30 or more, with the upper limit thereof being in a range of 49 or less, especially, 45 or less and a Shore D hardness of the outermost cover layer may be in a range of 56 or more, especially, 59 or more, with the upper limit thereof being in a range of 70 or less, especially, 65 or less, whereby the outermost cover layer is harder than the innermost cover layer. With this configuration, it is possible to obtain a multi-piece solid golf ball excellent in hitting feel and flight characteristics.

In this case, the diameter of the core may be in a range of 30 mm or more, especially, 34 mm or more, with the upper limit thereof being in a range of 40 mm or less, especially, 39 mm or less; the thickness of the innermost cover layer may be in a range of 0.5 mm or more, especially, 1.0 mm or more, with the upper limit thereof being in a range of 5.0 mm or less, especially, 2.5 mm or less; the thickness of the outermost cover layer may be in a range of 1.0 mm or more, especially, 1.3 mm or more, with the upper limit thereof being in a range of 3.0 mm or less, especially, 2.2 mm or less; and the total thickness of the cover may be in a range of 1.5 mm or more, especially, 2.5 mm or more, with the upper limit thereof being in a range of 8.0 mm or less, especially, 6.0 mm or less.

In the case of applying the golf ball of the present invention to a two-piece golf ball, a deflection amount, measured under an applied load of 100 kg, of the core formed from the rubber composition of the present invention may be in a range of 2.0 mm or more, especially, 2.8 mm or more, with the upper limit thereof being in a range of 5.0 mm or less, especially, 4.5 mm or less; and a Shore D hardness of the cover may be in a range of 30 or more, especially, 40 or more, with the upper limit thereof being in a range of 65 or less, especially, 62 or less. With this configuration, it is possible to obtain a two-piece golf ball having soft hitting feel while ensuring a long flight distance.

In this case, the diameter of the core may be in a range of 37 mm or more, especially, 39.5 mm or more, with the upper limit thereof being in a range of 41 mm or less, especially, 40.5 mm or less.

The golf ball according to the present invention can be produced as that for competition in accordance with the Rules of Golf. To be more specific, the solid golf ball can be formed so as to have a diameter of 42.67 mm or more and a weight of 45.93 g or less in accordance with the Rules of Golf. It is recommended that the upper limit of the diameter be in a range of 44.0 mm or less, preferably, 43.5 mm or less, more preferably, 43.0 mm or less, and that the lower limit of the weight be in a range of 44.5 g or more, preferably, 45.0 g or more, more preferably, 45.1 g or more, most preferably, 45.2 g or more.

The golf ball of the present invention can be produced with good workability by using the rubber composition capable of eliminating occurrence of burn at the time of kneading the rubber composition without degrading the rebound characteristic of the rubber composition.

EXAMPLE

The present invention will be more fully described by way of examples, together with comparative examples, although the present invention is not limited thereto.

Examples 1 to 5, Comparative Examples 1 to 7

A compound of raw materials in each of compositions (blended amounts being all on the basis of parts by weight) shown in Table 1 was vulcanized under a vulcanizing condition of 160° C.×17 min, to produce a solid core having a diameter of 38.9 mm. The compound was obtained by blending the raw materials except for the organic peroxide in Table 1, kneading the blend at a temperature of 80–120° C. in a Banbury mixer, and then adding the organic peroxide to the mixture in an amount shown in Table 1 and kneading again the blend at a temperature of 40 to 80° C.

The details of the raw materials and evaluation of the core shown in Table 1 are as follows:

BR18: Polybutadiene (catalyst metal used for synthesis: Ni, content of cis-1,4-bonds: 96%, and Mooney viscosity: 44) available from JSR Corporation
UBE101: Polybutadiene (catalyst metal used for synthesis: Co, content of cis-1,4-bonds: 95%, and Mooney viscosity: 38) available from Ube Industries, Ltd.
CB22: Polybutadiene (catalyst metal used for synthesis: Nd, content of cis-1,4-bonds: 96%, and Mooney viscosity: 62) available from DIC Bayer Polymer Ltd.
CB24: Polybutadiene (catalyst metal used for synthesis: Nd, content of cis-1,4-bonds: 96%, and Mooney viscosity: 44) available from DIC Bayer Polymer Ltd.
HCBN13: Polybutadiene (catalyst metal used for synthesis: Nd, content of cis-1,4-bonds: 96%, and Mooney viscosity: 53) available from JSR Corporation
NOCRAC 200: 2,6-di-t-butyl-4-methylphenol available from Ouchishinko Chemical Industrial Co., Ltd.
NOCRAC NS6: 2,2'-methylene-bis(4-methyl-6-t-butylphenol)) available from Ouchishinko Chemical Industrial Co., Ltd.
Perhexa 3M: 1,1-bis(t-butylperoxy)-3,3,5-trimethyl cyclohexane (half-life period at 155° C.: 40 sec) available from NOF Corporation
Percumyl D: dicumyl peroxide (half-life period at 155° C.: 480 sec) available from NOF Corporation Characteristics of each solid core for a golf ball were evaluated as follows. The results are shown in Table 1.
Rebound Characteristic (m/s)
The initial velocity was measured by an initial speed meter of the same type as that specified under authorized organ, USGA and a difference between the initial velocity in Comparative Example 4 (taken as a reference value) and the initial velocity in each of Examples 1 to 5 and Comparative Examples 1 to 3 and 5 to 7 was calculated.
Hardness (mm) of Core
A deflection amount of the solid core was measured under an applied load of 980 N (100 kg).

TABLE 1

| Polybutadiene | Catalyst | Cis-1,4-bond | Mooney Viscosity | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|---|---|
| BR18 | Ni | 96 | 44 | 100 | | | | | 100 | | | | | | |
| UBE101 | Co | 95 | 38 | | | | | | | | | | 100 | | |
| CB22 | Nd | 96 | 62 | | 100 | | | | | 100 | 100 | | | | 100 |
| CB24 | Nd | 96 | 44 | | | 100 | | | | | | 100 | | | |
| HCBN13 | Nd | 96 | 53 | | | | 100 | 100 | | | | | | 100 | |
| Antioxidant | NOCRAC 200 | | | 0.5 | 1 | 0.5 | 0.5 | 0.5 | | | | | | | |
| | NOCRAC NS6 | | | | | | | | 0.2 | 0.2 | 0 | 0.2 | 0.2 | 0.2 | 0.5 |
| Zinc Acrylate | | | | 29 | 29 | 29 | 29 | 29 | 29 | 29 | 29 | 29 | 29 | 29 | 29 |
| Zinc Oxide | | | | 19.3 | 19.3 | 19.3 | 19.3 | 19.3 | 19.3 | 19.3 | 19.3 | 19.3 | 19.3 | 19.3 | 19.3 |
| Organic Sulfur Compound | Pentachlorothiophenol | | | 1 | 1 | 1 | 1 | 1 | 1 | 1 | 1 | 1 | 1 | 1 | 1 |
| Organic Peroxide | Perhexa 3M | | | 0.12 | 0.12 | 0.12 | 0.12 | 0.24 | 0.12 | 0.12 | 0.12 | 0.12 | 0.12 | 0.12 | 0.12 |
| | Percumyl D | | | 0.3 | 0.3 | 0.3 | 0.3 | 0.6 | 0.3 | 0.3 | 0.3 | 0.3 | 0.3 | 0.3 | 0.3 |
| Rebound Characteristic (m/s) | | | | 0 | 0.2 | 0.15 | 0.2 | 0.1 | −0.1 | 0.1 | 0.05 | 0 | 0.1 | −0.1 | −0.2 |
| Hardness of Core (mm) | | | | 3.7 | 4.1 | 4.2 | 3.4 | 3.0 | 3.9 | 4.2 | 4 | 4.3 | 3.6 | 4 | 4.4 |
| Burn during Kneading | | | | ○ | ○ | ○ | ○ | ○ | ○ | ○ | X | ○ | ○ | ○ | ○ |

Burn During Kneading
The external appearance of the solid core was visually evaluated:
○: burn not observed
X: burn observed
With respect to the solid core in each of Examples 1 to 5, any burn at the time of kneading the rubber composition was not observed, and any reduction in rebound characteristic was not found.
On the other hand, with respect to the solid core in Comparative Example 3 using the rubber composition containing no antioxidant, the rebound characteristic was reduced because of occurrence of burn at the time of kneading the rubber composition.
The solid core in each of Comparative Examples 1, 2, 4, 5, 6, and 7 was inferior in rebound characteristic to the solid core in each of Examples 1 to 5 using the rubber composition containing the monophenol based antioxidant.

While the preferred embodiments of the present invention have been described using specific terms, such description is for illustrative purposes only, and it is to be understood that changes and variations may be made without departing from the spirit or scope of the following claims.

What is claimed is:

1. A golf ball comprising, as a composing element, a hot-molded product of a rubber composition, said rubber composition containing a polybutadiene having 60 wt % or more of cis-1,4-bonds and 40 or more of a Mooney viscosity ($ML_{1+4}(100°$ C.)), unsaturated carboxylic acid and/or a metal salt thereof, an organic peroxide, and a monophenol based antioxidant.

2. A golf ball according to claim 1, wherein said polybutadiene is obtained by synthesis using a rare earth element based catalyst.

3. A golf ball according to claim 1, wherein the blended amount of said organic peroxide is in a range of 0.1 to 0.9 part by weight on the basis of 100 parts by weight of said polybutadiene.

4. A golf ball according to claim 1, wherein the blended amount of said monophenol based antioxidant is in a range of 0.05 to 3 parts by weight on the basis of 100 parts by weight of said polybutadiene.

5. A golf ball according to claim 1, wherein said organic peroxide is composed of two or more kinds of organic peroxides, and letting the organic oxide shortest in half-life period at 155° C. be (a), the organic oxide longest in half-life period at 155° C. be (b), the half-life period of said organic peroxide (a) be ($a_1$), and the half-life period of said organic peroxide (b) be ($b_1$), the ratio $b_1/a_1$ is in a range of 7 or more.

6. A golf ball according to claim 1, wherein said hot-molded product is used as a core of a solid golf ball.

* * * * *